United States Patent [19]

Bennett et al.

[11] Patent Number: 4,509,536
[45] Date of Patent: Apr. 9, 1985

[54] TOBACCO STRIPPER

[75] Inventors: Jackie D. Bennett; Johnnie R. Bennett, both of Thompson Station; Jimmie D. Bennett, Jr., Franklin, all of Tenn.

[73] Assignee: 3-J-Co., Inc., Franklin, Tenn.

[21] Appl. No.: 312,144

[22] Filed: Oct. 16, 1981

Related U.S. Application Data

[63] Continuation-in-part of Ser. No. 266,052, May 21, 1981.

[51] Int. Cl.³ .............................................. A01D 45/16
[52] U.S. Cl. .................................. 130/30 R; 56/27.5; 171/61
[58] Field of Search ............. 130/3 B, 30 R; 56/27.5; 171/61

[56] References Cited

U.S. PATENT DOCUMENTS 4,373,323  2/1983  Jones .............................. 130/30 R Primary Examiner—V. Millin
Attorney, Agent, or Firm—Harrington A. Lackey

[57] ABSTRACT

Two gears or cogwheels rotating in opposite directions and constructed so that the cogs of each fit most of the way, but not all of the way, in to the grooves or notches of the other, but not enough to intermesh or completely fill the gaps to strip leaves from the stalks as they are pulled between the turning cogs. The leaves fall into boxes or presses beneath the cogwheels, and the boxes or presses may be guided along rollers to the stripping point. One of the two gears is driven by a motor-pulley arrangement and the other gear is driven by the contiguous belts carried by the motor-driven pulley and a pulley coaxial with the other gear.

9 Claims, 7 Drawing Figures

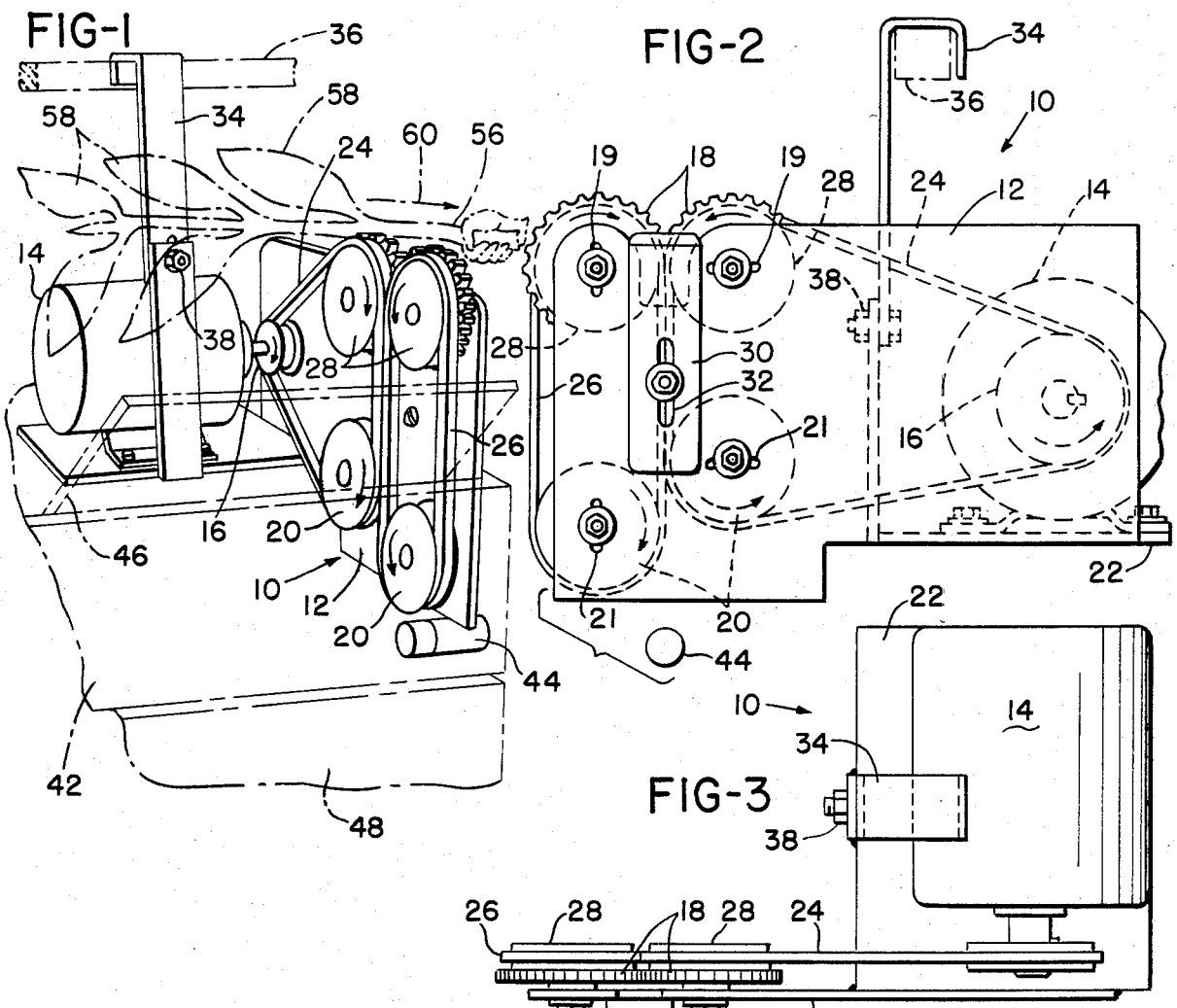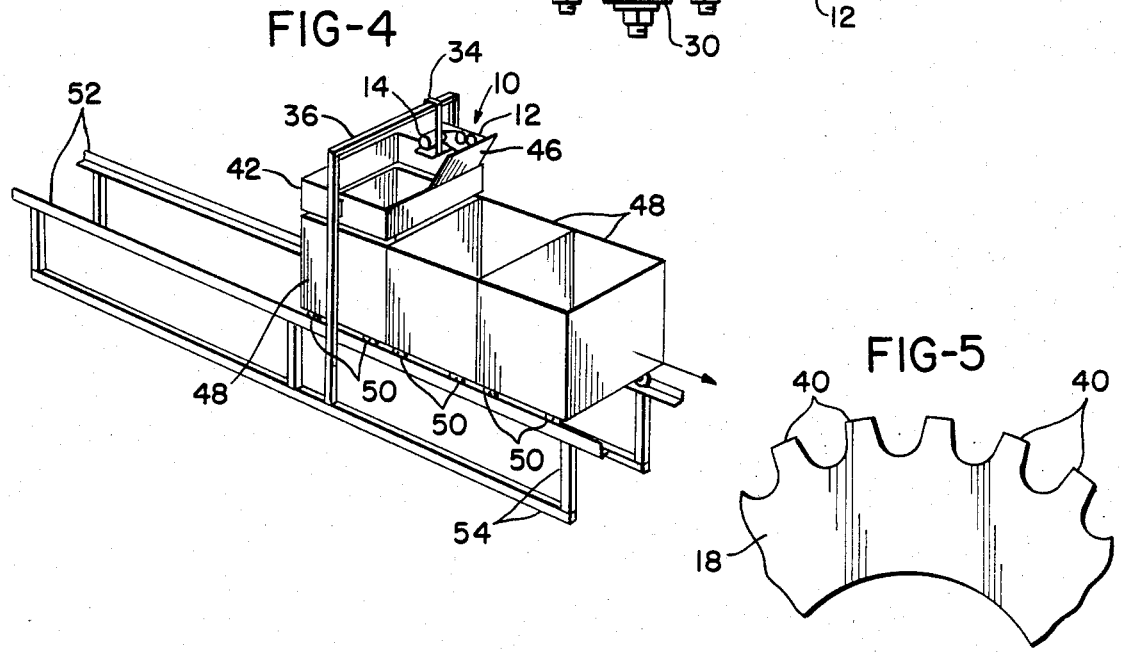

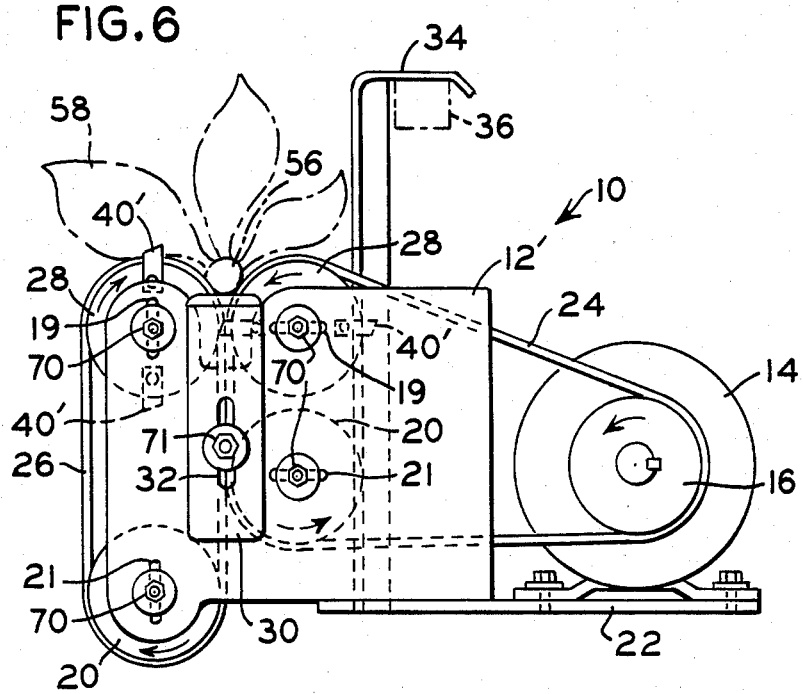
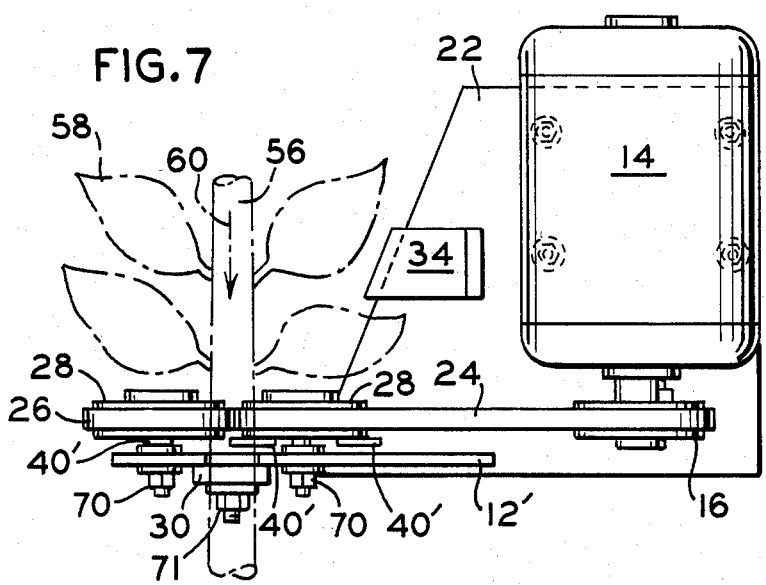

TOBACCO STRIPPER

CROSS-REFERENCE TO RELATED APPLICATION

This is a continuation-in-part of application Ser. No. 266,052, May 21, 1981 of Jackie D. Bennett and Johnnie R. Bennett for "TOBACCO STRIPPER."

BACKGROUND OF THE INVENTION

1. Field of the Invention

This invention relates to apparatus for stripping tobacco. More particularly, it relates to gear or gear-type apparatus whereby tobacco leaves are stripped from the stalks by pulling the stalk between counter-rotating gears.

2. Description of the Prior Art

In co-pending application Ser. No. 266,052 now abandoned by co-inventors Jackie D. Bennett and Johnnie R. Bennett is disclosed a tobacco stripping which strips leaves from the stalks by passing or pulling the stalks along the nip formed between two-counter-rotating rolls or rollers. While such a stripper is highly effective in removing the leaves as desired, some of the leaves may not be completely removed from the stalk, by the rolls or rollers.

SUMMARY OF THE INVENTION

After extended investigation we have found that two gears rotating against one another may be used to strip tobacco leaves from their stalks if the stalks are pulled along and adjacent to a nip formed between the rotating gears. If the gear cogs intermesh and act as gears so that one gear actually turns the other, the leaves will not be effectively stripped from the stalks. For efficient stripping the gear cogs should fit most of the way, but not all the way, into the opposing grooves or notches of the other gear of the pair of counter-rotating gears. The grooves or notches are substantially of a shortened semi-elipse in shape.

As may be seen in more detail from the drawing, belts fit adjacent the oppositely turning gears according to our invention. The belts rotate around pulleys, drums, wheels or rollers in a conventional manner. The belt which turns one of the gears is driven by a motor through a motor pulley, a wheel, drum or roll. The belt also passes around an idler pulley, wheel, drum or roller positioned below the gear pulley. The belt which drives the other or second gear passes around another or second idler pulley below the second gear pulley, and preferably below the first idler pulley. As will be understood in a clearer manner from the drawing herewith, the motor-driven belt which causes the first gear to turn touches the other, or second, belt to drive the second gear and idler pulley in a direction opposite or counter to that in which the first gear is driven.

According to a preferred embodiment of the invention, the presses into which the tobacco leaves fall, or boxes, may be pushed or pulled along a track so as to be positioned right below the stripper, which may be hung on a 2 by 4 or like arrangement connected to the track or otherwise anchored so as to hold the stripper steady. The stripper may be positioned on a table top or the like or on an extension from a framework so that it will not interfere with the boxes or presses into which the leaves fall as they are being stripped from the tobacco stalks. A blade or guide is preferably used to guide the stalk between, but slightly above, the turning gears as the stalk is being pulled by the person operating the stripper. This operation may be understood more clearly by reference to FIG. 1 of the drawing.

A fan or blower blows air in a direction such that the tobacco leaves fall evenly on top of one another as they fall into the press or box.

DESCRIPTION OF THE DRAWING AND OF A PREFERRED EMBODIMENT

A better understanding of our invention may be had by reference to the drawing which forms a part hereof and to the description thereof which follows.

In the drawing,

FIG. 1 is a perspective view of the tobacco stripper of the invention, including the bin, box or press into which the leaves fall as they are stripped from the tobacco stalks.

FIG. 2 is a front view of the stripper showing the guide, blade or knife bar.

FIG. 3 is a top plan view of the tobacco stripper of the invention.

FIG. 4 is a perspective view of the track or rails along which the bins, boxes or presses are conveyed to the stripper as shown.

FIG. 5 is an enlarged broken view from one side of a tobacco stripper gear according to the invention.

FIG. 6 is a front elevational view of the stripper including modified cogs; and

FIG. 7 is a top plan view of the stripper disclosed in FIG. 6.

As stalk 56 is pulled through stripper 10, cogs 40 (such as shown in detail in FIG. 5) or 40' in FIGS. 6 and 7, rub the stalk 56 and pull the leaves 58 down into the belts 26 and 24. The guide bar, blade, or adjustable knife bar 30 acts as a guide and support for the stalk, and also prevents the possible cutting of the stalk in two. The guide or knife bar 30 also is used for cutting the tips of the tobacco stalks. Belts 24 and 26 snatch off a leaf 58 from the stalk 56 as an operator, holding the stalk 56 (FIG. 1), twists his wrist to flop the leaf 58 in between the merging belts 24 and 26, after the gears have picked up the leaf 58 and pulled it into the belts 24 and 26, which turn around pulleys, wheels, or drums 28. Belt 24 turns around drive pulley 16, driven by motor 14. Belt 24 is also carried by the higher or idler pulleys, or belt guide members, 20, and one of the gear pulleys 28, to drive or rotate the gear 18 associated with the corresponding gear pulley 28. Turning belt 24 touches belt 26, thereby turning belt 26 to drive counter-rotating gear (unnumbered in FIG. 1, constructed like gear 18 of FIG. 5 and gears 18 of FIG. 2 which do the stripping and are adjustable).

Tobacco stripper 10 has a support hanger 34 for hanging it or supporting it on support bar, for example, a 2×4, 36. Adjuster 38 is provided for adjusting stripper support 34.

A fan 44 is depicted in FIGS. 1 and 2 for laying the leaves 56 substantially flat and in order smoothly in bins, boxes or presses 48, which may have an upper protector portion 42 having a bank board or leaf guide 46, if desired. The arrow 60 in FIG. 1 shows the direction of pulling stalks.

In FIG. 4, bins, boxes or presses 48 are shown being rolled on rollers or wheels 50 on tracks 52 supported by framework 54 toward their respective loading positions under tobacco stripper 10.

In FIG. 5, gear 18 is depicted as having circumferentially spaced cogs 40 which have shortened semi-elliptical-shaped grooves or indentations between the cogs 40.

FIGS. 6 and 7 disclose the tobacco stripper 10 having substantially the same parts as disclosed in FIG. 2, but including a different form of cog 40', which is fixed directly to a corresponding pulley 28. As disclosed in FIG. 6, two diametrically opposed cogs 40' are fixed on each pulley 28 for carrying out the same function as the cogs 40 on the gears 18, disclosed in FIGS. 1-3.

The tobacco stripper 10 of the invention may be used to classify the tobacco leaves 58 by stripping the trash, bright and tips into separate bins or boxes or presses 48 by using the rail arrangement shown in FIG. 4. The tobacco stripper 10 may also be used to strip all of the leaves into one box, bin or press without grading the leaves as trash, bright and tips.

While the invention has been described in terms of preferred embodiments, the claims appended hereto are intended to encompass all embodiments which fall within the spirit of the invention.

Having thus described our invention and certain preferred embodiments thereof, we claim:

1. An apparatus for stripping leaves from a tobacco stalk comprising:
   (a) a base,
   (b) first and second pulleys,
   (c) a first endless belt entrained around said first pulley for rotary movement therewith,
   (d) a second endless belt entrained around said second pulley for rotary movement therewith,
   (e) mounting means supporting said pulleys on said base for rotary movement about parallel axes and closely adjacent each other to cause said first and second belts to converge into contiguous relationship to form a nip, each of said first and second belts having inner and outer leg portions,
   (f) first and second belt guide members, said first belt passing around said first belt guide member, and said second belt passing around said second belt guide member,
   (g) said mounting means supporting said first and second belt guide members so that said inner leg portions are in substantial contiguous engagement for a predetermined length of said inner leg portions,
   (h) means for driving said first belt so that said substantially contiguously engaging inner leg portions move in the same direction together from said pulleys toward said belt guide members to grip and pull a leaf from a tobacco stalk in a stripping position in which the tobacco stalk is drawn longitudinally adjacent said nip and substantially parallel to said rotary axes, and
   (i) at least one leaf cog fixed adjacent at least one of said first and second pulleys and projecting radially beyond the periphery of said corresponding pulley for drawing leaves from the tobacco stalk in said stripping position toward said nip.

2. The invention according to claim 1 further comprising a plurality of said leaf cogs, said leaf cogs forming the periphery of a gear mounted coaxially of one of said first and second pulleys for rotary movement therewith.

3. The invention according to claim 2 in which said plurality of leaf cogs form the peripheries of a pair of first and second gears, said first gear being mounted coaxially of said first pulley to rotate therewith, and said second gear being mounted coaxially of said second pulley to rotate therewith, the spacing between said adjacent leaf cogs forming uniform grooves, each groove being slightly larger than a corresponding gear cog, cogs on said first and second gears being interdigitated with each other normally in non-driving engagement.

4. The invention according to claim 1 further comprising a guide bar having a guide edge, means supporting said guide bar adjacent said pulleys so that said guide edge engages the tobacco stalk in said stripping position to prevent the stalk from being pulled between said inner leg portions.

5. The invention according to claim 1 in which said guide edge is sufficiently sharp to sever a tobacco stalk.

6. The invention according to claim 1 in which said second belt and said second pulley are driven through frictional engagement of said second belt with said first belt.

7. The invention according to claim 1 in which said first pulley and first guide member are spaced apart a first predetermined distance and said second pulley and said second guide member are spaced apart a second predetermined distance unequal to said first distance.

8. The invention according to claim 1 further comprising a plurality of boxes for receiving tobacco leaves, and means for conveying said boxes beneath said base, in order to position one box at a time beneath said base for receiving leaves from said first and second endless belts.

9. The invention according to claim 8 in which said conveying means comprises elongated rails extending longitudinally beneath said base and wheels on said boxes for engaging said rails.

* * * * *